United States Patent

[11] 3,591,913

| [72] | Inventor | James W. Lewis |
| | | 410 Pasadena Drive, Erie, Pa. 16505 |
| [21] | Appl. No. | 775,713 |
| [22] | Filed | Nov. 14, 1968 |
| [45] | Patented | July 13, 1971 |

[54] RECIPROCATING AND OSCILLATING TOOLPLATE MACHINE
14 Claims, 5 Drawing Figs.

[52] U.S. Cl. .................................................. 29/208, 29/211
[51] Int. Cl. .................................................. B23p 19/04, B23g 7/10
[50] Field of Search .................................... 29/208, 211, 208 I, 211 D, 200

[56] References Cited
UNITED STATES PATENTS

| 3,065,530 | 11/1962 | Merchant et al. | 29/208 X |
| 3,143,792 | 8/1964 | Swanson et al. | 29/208 |
| 3,231,968 | 2/1966 | Swanson | 29/208 |

*Primary Examiner*—Thomas H. Eager
*Attorney*—Charles L. Lovercheck

ABSTRACT: A machine for handling articles of manufacture such as small components at high rates of speed. The machine has an indexing plate, a fixed plate, and a moving plate that oscillates horizontally and reciprocates vertically. The several plates are supported on a cabinet housing which contains the index mechanism and the oscillating-reciprocating mechanism, placement heads, probes and other devices may be supported on the oscillating plate. The fixed plate may carry receptacles to receive articles from suitable feeders. The articles may move from the receptacles by the placement heads or other devices to fixtures supported on the indexing plate. Parts are fed into the machine to stationary tracks supported on the fixed plate, picked up by placement heads, oscillated to position over the fixtures and loaded vertically. The several plates are supported on a column. A raceway supported on the column in which electrical power, air and vacuum may be supplied to the machine.

PATENTED JUL 13 1971

INVENTOR
JAMES W. LEWIS

BY Charles L. Lovershuk

ATTORNEY

RECIPROCATING AND OSCILLATING TOOLPLATE MACHINE

1. Background of Invention

This invention relates to assembly machines and, more particularly, to an assembly machine having both oscillating and reciprocating motion.

2. Description of Prior Art

The machine disclosed herein constitutes an improvement over the machine shown in U. S. Pat. No. 3,065,530.

OBJECTS OF THE INVENTION

It is an object of the present invention to provide an improved assembly machine.

Another object of the invention is to provide an assembly machine that is simple in construction, economical to manufacture, and simple and efficient to use.

Another object of the invention is to provide an improved assembly machine having both reciprocating and oscillating motions relative to an indexing table.

Another object of the invention is to provide a combination assembly machine and feeding apparatus for the machine wherein the assembly machine has both reciprocating and oscillating motion.

Figure 1:
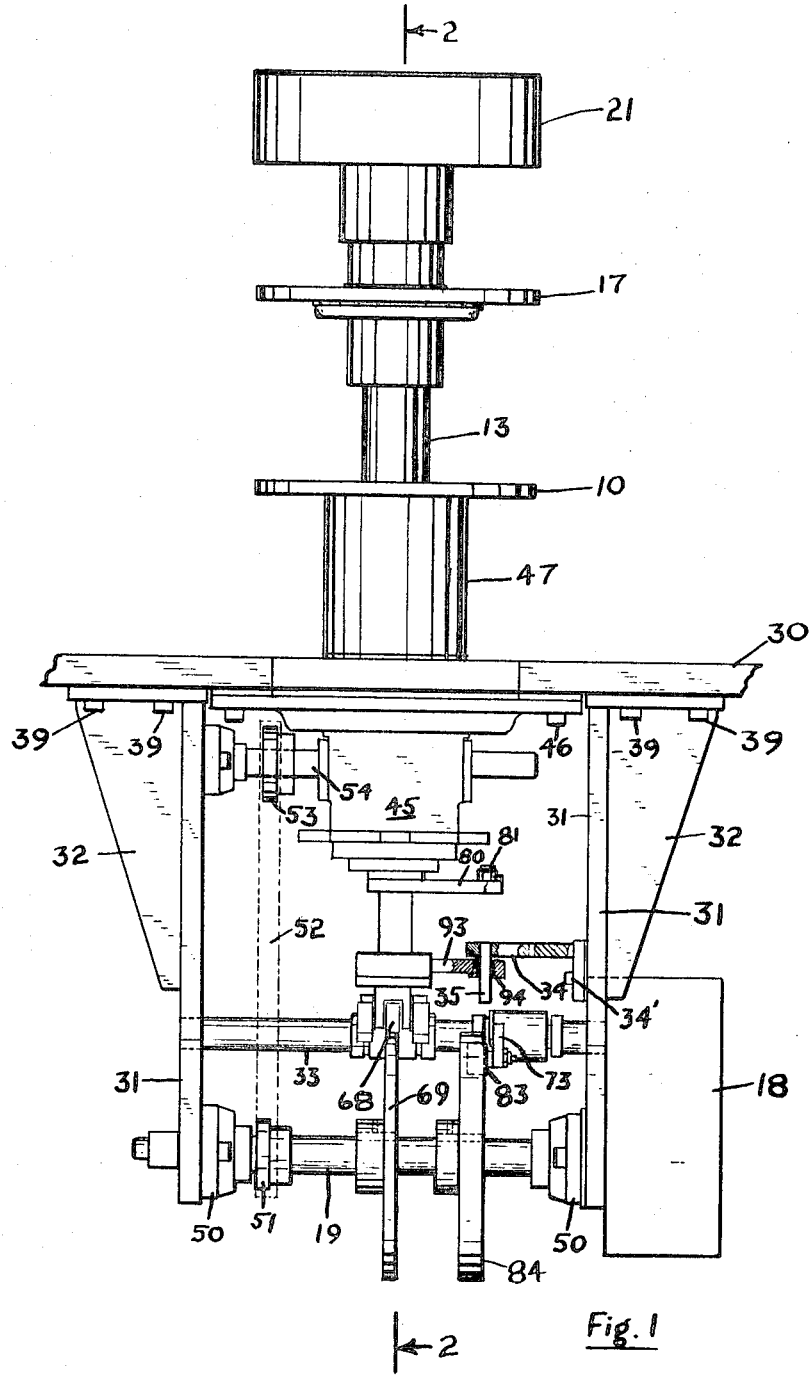
FIG. 1 is a front view of the machine showing the cabinet structure broken away.

Now with more particular reference to the drawings, the machine consists generally of a cabinet 25 having a top 30 on which the indexing table 10 is supported. Table 10 has fixtures 11 attached to its outer periphery. A plate 12 is fixed to the hollow column 37 relative to the top 30 on the vertical column. The plate 17 reciprocates vertically and oscillates horizontally. Placement heads 14 are attached to the plate 17 and probes 15 and other devices are supported on the heads 14. The cabinet top 30 forms a base and has the cabinet structure 25 that houses drive 18, camshaft 19, and controls 20. The various motions of the machine are provided by the cams 69 and 84 which are supported on a single shaft 19.

Parts of articles of manufacture are fed into the machine by feeders 40 and 41 and are conveyed through tracks 42 and 43 to position on plate 10.

A raceway 21 is supported on the upper end of the column and this raceway houses electrical lines, air lines, vacuum lines and other sources of power to the devices on the plate 17.

DETAILED DESCRIPTION OF DRAWINGS

The cabinet 25 supports the cabinet top 30 which may be a relatively rigid plate having the depending supports 31 fixed to the bottom of the plate 30 and held rigidly thereto by means of the gusset plates 32. The supports 31 and gusset plates 32 may be fixed to the cabinet top 30 by means of studs 39.

The pivot shaft 33 is fixed to supports 31 at its opposite ends and it supports several of the elements of the machine between the plates 31. A locating bracket 34 is fixed to the plate 31 by means of a stud 34' and this bracket carries locating pin 35 which is provided for a purpose which will be explained hereinafter. The indexing mechanism 45 is fixed to the bottom of the cabinet top 30 by means of studs 46. The plate 10 is supported on a sleeve 47 which is concentric to the hollow column 37 and is rotated in intermittent steps by the indexing mechanism 45.

The reciprocating motion and the oscillating motion of plate 17 are both produced by the cam assembly made up of the drive which is enclosed in the housing 18 which drives the shaft 19 at a constant speed and therefore rotates the cam wheels 69 and 84. The camshaft 19 is journalled in the support plates 31 by bearings 50. The motor in the drive enclosed at 18 may be a variable speed DC motor so that the speed of the camshaft 19 and therefore the speed of movement of the plate 17 can be varied as desired.

The indexing mechanism 45 is driven at a constant rate by sprocket 51 which acts through a chain 52 to drive the sprocket 53 and consequently the shaft 54.

The indexing mechanism 45 may be any suitable type of crossover cam arrangement familiar to those skilled in the art. The indexing mechanism could obviously be any other suitable type such as the Geneva gear type of indexing mechanism.

The raceway 21 is generally in the form of an inverted cup with channels 22, 23 and 24 in it. These channels may communicate with the feeder raceway 58 and air, electricity, and vacuum may be supplied by suitable lines in raceway 58 and raceway 22, 23 and 24.

The raceway 21 is supported on the upper end of the vertical column 13. The vertical column is supported on plate 60. Plate 60 is attached to the lower side of the cabinet top by studs 61.

The shaft 62 is slidably and rotatably received in column 37. A cam follower 68 is fixed to the lower end of shaft 62 and this cam follower runs on the outer periphery of the cam wheel 69 which is fixed to shaft 19. The spring 70 is supported at 74 on bracket 72 and bracket 72 is fixed to the bottom of the cabinet top 30. The spring 70 acts through bellcrank 73 to hold the follower wheel 68 in contact with the outer periphery of the cam wheel 69.

Thus as the camshaft 19 rotates, the cam wheel 69 causes the shaft 62 to move up and down. The upper end of the shaft 62 is fixed to the spider 75 and the outer legs of the spider are fixed to the flange 76 by studs 77.

The link 78 is pivotally connected to the upper end of the bellcrank link 85 at 79 and to the link 80 at 81. Thus the link 80 will cause the shaft 62 to oscillate through an arc of predetermined degree determined by the length of link 78 which may be adjusted to control the arc of movement of oscillation. The link 93 has a hole 94 in it which locates on pin 35.

Figure 2:
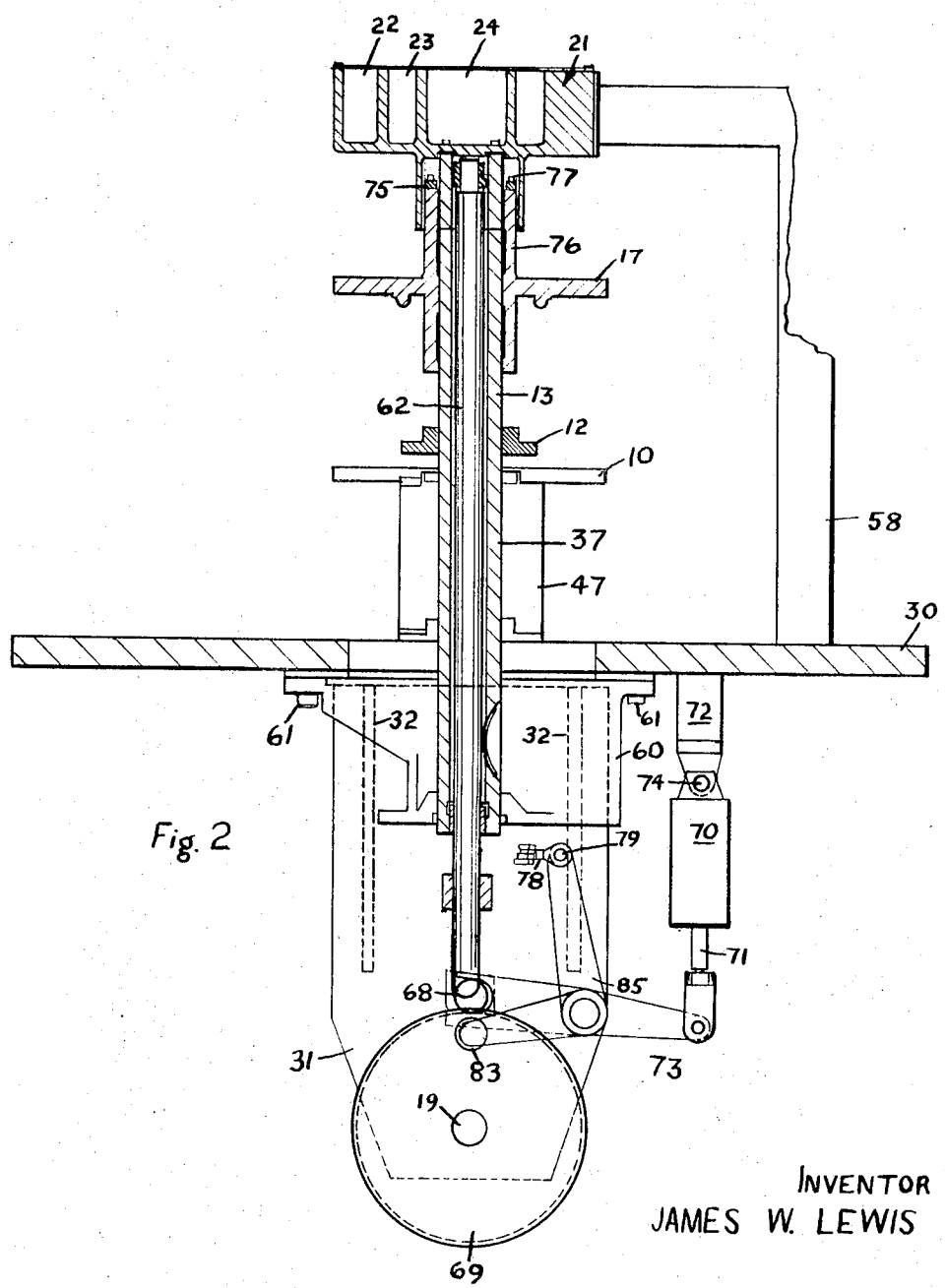
FIG. 2 is a cross-sectional view taken on line 2-2 of FIG. 1.
Figure 4:
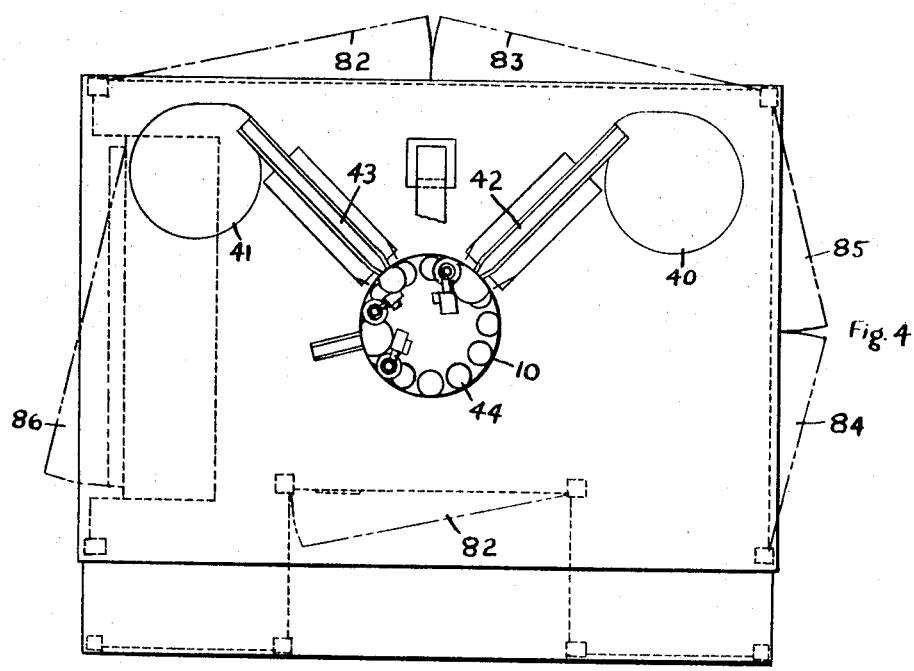
FIG. 4 is a top view of the machine.
Figure 3:
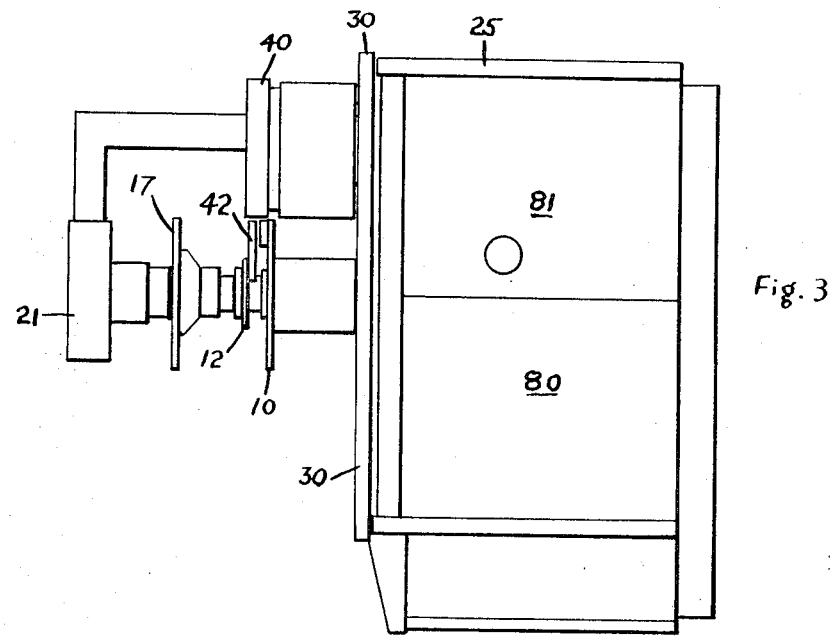
FIG. 3 is a side view of the machine.
Figure 5:
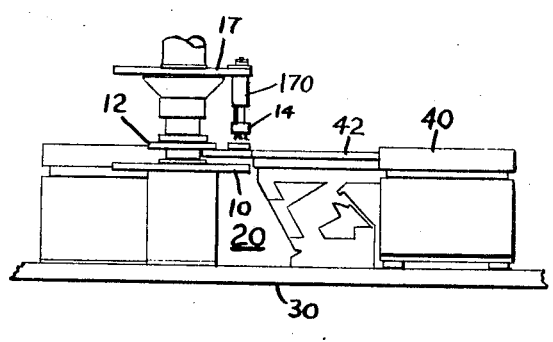
FIG. 5 is a front view of the machine showing the top portion broken away.

The cabinet shown has doors 80 and 81 and access door 82 at the rear of the machine. Likewise it has access doors 83, 84, 85 and 86 through which access may be had to the mechanism shown in FIGS. 1 and 2.

The bowl-type vibratory parts feeders 40 and 41 are shown supported on the cabinet top 30 for feeding parts down tracks 42 and 43 to the positions on fixed plate 12 where they will be picked up by the devices having cylinders 70 and pickup heads 172 and 173. The drive 18 will then be started, thus driving camshaft 19 and cam wheels 84 and 69, thus the plate 17 will be given an oscillating motion which will bring the heads 172 and 173 into engagement with parts fed from the feeders 41 down tracks 43 and 44. The parts will then be moved from the tracks 43 and 44 by the oscillating motion of the plate 72 and then will be moved downward into their receiving members 44 supported on the index plate 10. Each time a part is fed into one of the devices 44, the index plate will index to another position and later under the position to receive parts from the feeder 41.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege I claim are defined as follows:

1. A machine for assembling articles of manufacture comprising, a base, a vertical column on said base, a mounting means on said column for assembling articles of manufacture, cam means supported below said mounting means, means supporting said column on said mounting means for rotation and reciprocation thereon, said mounting means comprising a first member, a second member and a third member supported on said column to be oscillated and rotated relative to each other, a moving means fixed to said column and disposed above said mounting means, said cam means being adapted to move said column in a direction perpendicular to said mounting means and to rotate said column whereby said moving means is rotated and oscillated and said articles of manufacture are assembled.

2. The machine recited in claim 1 wherein said cam means comprises, a shaft, means to rotate said shaft, a plurality of cams fixed to said shaft, and follower members engaging the cams, said followers being attached to lever means connected to said vertical column.

3. A machine for assembling articles of manufacture comprising, a base, a column fixed to said base and extending upwardly therefrom, an index table supported above said base and generally concentric to said column, means to rotate said index table to move it intermittently, a shaft disposed generally concentric to said column, a mounting plate fixed to said shaft disposed generally concentric to said shaft and to said column, placement heads attached to said plate, fixtures on said table, first feeding means for feeding first parts of articles to said fixtures, Second feeding means for feeding second parts of said articles to said placement heads, second feeding means for feeding second parts of said articles to said placement heads, and means to oscillate said shaft and said plate attached thereto in a path concentric to said shaft and to reciprocate said shaft whereby said first parts are moved from said placement heads to said fixtures and said first parts are assembled to said second parts.

4. The machine recited in claim 3 wherein said means to oscillate said shaft comprises a cam driven at a constant rate, and follower means on said shaft, said follower means engaging said cam.

5. The machine recited in claim 4 wherein a second cam on said machine is connected to means to drive said second cam in synchronism with said first mentioned cam, a link means fixed to said shaft and means engaging said second cam for oscillating said shaft in a rotary path in synchronism with said reciprocation.

6. The machine recited in claim 5 wherein said means to index said table is connected to said cams whereby said table indexes in synchronism with the movement of said cams.

7. A machine comprising a rotary plate, an index table, and a fixed member, means on said plate to receive a first part of an article, means on said index plate to receive a second part, and means to oscillate and reciprocate said plate whereby said first part is moved to said second part for assembling with said second part.

8. The machine recited in claim 5 wherein said cams are supported on a cam shaft, and said index means is driven by a sprocket on said camshaft and a chain connected to a sprocket on said index means.

9. The machine recited in claim 6 wherein said column is a tubular member and said shaft extends through said tubular member, said shaft has said followers on its lower end and is connected to said rotary table at its upper end.

10. The machine recited in claim 9 wherein said index mechanism comprises a crossover cam means.

11. The machine recited in any of the preceding claims wherein locating means is provided to precisely locate the position of said plate and said table.

12. A machine comprising a cabinet top, spaced supports extending downward from said top, a pivot shaft having its ends supported on said supports, a camshaft, bearing means rotatably supporting said camshaft on said supports, spaced cam wheels on said camshaft, a hollow vertical column supported on said cabinet top and extending upwardly therefrom, a fixed plate fixed to said column and disposed generally parallel to said top, a vertical shaft extending through said column, a rotating plate attached to said vertical shaft above said fixed plate, said rotating plate being generally parallel to said fixed plate, an index plate disposed concentric to said vertical shaft and parallel to said rotating plate, index means on said machine connected to said index plate and driven by said cam shaft, follower means on said vertical shaft engaging one of said cams for reciprocating said vertical shaft up and down, a link fixed to said vertical shaft and extending perpendicularly thereto, follower means engaging said link and engaging one said cam for oscillating said vertical shaft in rotation.

13. The machine recited in claim 12 wherein a raceway is supported on said column above said rotating plate, said raceway being adapted to receive electrical wires and air lines.

14. The machine recited in claim 12 wherein means is supported on said index plate to carry a product, spaced feeder means are supported on said top, placement heads are supported on said rotating plate, said placement heads being adapted to move parts fed from said feeders to said product on said index plate.